UNITED STATES PATENT OFFICE.

CHARLES H. HOWARD, OF BATAVIA, NEW YORK.

IMPROVEMENT IN COMPOSITION SIDEWALKS.

Specification forming part of Letters Patent No. 136,919, dated March 18, 1873.

*To all whom it may concern:*

Be it known that I, CHARLES H. HOWARD, of Batavia, in the county of Genesee and State of New York, have invented a new and Improved Method of Constructing Sidewalks, &c., of which the following is a specification:

This invention has for its object to construct a sidewalk or pavement without having to haul loads of stones, bricks, gravel, or other matter to the locality of the proposed walk or pavement, which stones, brick, gravel, or other matter is usually embodied in the composition of walks, and used in place of the soil originally there contained. My invention consists in such a process of constructing walks, &c., that by the addition of certain chemicals, to wit, magnesia, carbonate of baryta, and silicate of soda, the soil originally on the site of the proposed walk will be utilized and hardened in the desired manner. This process will greatly facilitate the construction of walks and dispense with the necessity of transporting great loads of heavy materials for use therein.

In accordance with my invention I proceed as follows:

After the grade has been established, the earth to a depth of three or four inches and to the width of the proposed walk is thoroughly worked over and made very fine. A quantity of magnesia and carbonate of baryta mixed together, varying in proportion with the nature of the soil found on the ground, is introduced and mixed with the earth. In order to effect a thorough mixing I would prefer to first throw the earth in heaps and work it up in the manner mortar is usually worked up. After the chemicals above mentioned have been properly incorporated in the soil, silicate of soda (soluble glass) is added, and the earth then replaced in its bed and properly smoothed on the surface.

If it is desired to raise the walk above the surrounding earth, boards may be placed along the side until the mass hardens. If the boards are oiled before using, they may be easily withdrawn.

When the mass is almost dry, it should be covered over with a coat of chalk and magnesia mixed in water-glass.

This walk is cheaper than stone, will not rot like planks, and can be very rapidly made.

I preferably use two pounds of magnesia and one-quarter pound of carbonate of baryta for every square foot of sidewalk three inches in thickness, with just enough soluble glass to moisten the whole.

Having thus described my invention, I claim as new and desire to secure by Letters Patent—

The method of constructing sidewalks by applying carbonate of baryta and silicate of soda to the soil thereof, as described.

CHAS. H. HOWARD.

Witnesses:
LEWIS F. MCLEAN,
H. W. HOWARD.